US012743173B2

(12) United States Patent
Deng

(10) Patent No.: US 12,743,173 B2
(45) Date of Patent: Sep. 22, 2026

(54) TOUCH PANEL AND TOUCH DISPLAY DEVICE

(71) Applicant: KUNSHAN GO-VISIONOX OPTO-ELECTRONICS CO., LTD, Kunshan (CN)

(72) Inventor: Yichao Deng, Kunshan (CN)

(73) Assignee: Kunshan Go-Visionox Opto-Electronics Co., Ltd, Kunshan (CN)

( * ) Notice: Subject to any disclaimer, the term of this patent is extended or adjusted under 35 U.S.C. 154(b) by 0 days.

(21) Appl. No.: 18/920,131

(22) Filed: Oct. 18, 2024

(65) Prior Publication Data

US 2025/0044897 A1 Feb. 6, 2025

Related U.S. Application Data

(63) Continuation of application No. 18/168,809, filed on Feb. 14, 2023, now abandoned, which is a continuation of application No. PCT/CN2021/115200, filed on Aug. 30, 2021.

(30) Foreign Application Priority Data

Nov. 13, 2020 (CN) ......................... 202011270175.6

(51) Int. Cl.
*G06F 3/041* (2006.01)
*G06F 3/044* (2006.01)

(52) U.S. Cl.
CPC .......... *G06F 3/0418* (2013.01); *G06F 3/0443* (2019.05)

(58) Field of Classification Search
CPC ......... G06F 3/0418; G06F 3/044–0448; G06F 3/0412
See application file for complete search history.

(56) References Cited

U.S. PATENT DOCUMENTS 9,335,876 B2 * 5/2016 Chandran ............. G06F 3/0448
2013/0021289 A1 1/2013 Chen et al.
2013/0328830 A1 * 12/2013 Han ...................... G06F 3/0448 345/174

(Continued)

FOREIGN PATENT DOCUMENTS

CN 108646952 A 10/2018
CN 109766024 A 5/2019

(Continued)

OTHER PUBLICATIONS

International Search Report issued on Nov. 22, 2021, in corresponding International Application No. PCT/CN2021/115200, 4 pages.

(Continued)

*Primary Examiner* — David Tung
(74) *Attorney, Agent, or Firm* — Maier & Maier, PLLC

(57) ABSTRACT

A touch panel and a touch display device. The touch panel includes a plurality of touch electrodes disposed in the same layer. A touch electrode includes a touch sensing region and a capacitance adjustment region. The touch sensing region is configured to transmit a touch signal. The capacitance adjustment region is configured to reduce at least one of capacitance-to-ground of the touch electrode or coupling capacitance between two adjacent touch electrodes.

17 Claims, 10 Drawing Sheets

(56) References Cited

U.S. PATENT DOCUMENTS

| | | | |
|---|---|---|---|
| 2014/0285465 | A1 | 9/2014 | Hayashi et al. |
| 2016/0357337 | A1 | 12/2016 | Li et al. |
| 2017/0108964 | A1 | 4/2017 | Sato |
| 2017/0277346 | A1 | 9/2017 | Jeong et al. |
| 2019/0102017 | A1 | 4/2019 | Kim et al. |
| 2021/0373710 | A1 | 12/2021 | Ma et al. |

FOREIGN PATENT DOCUMENTS

| | | | |
|---|---|---|---|
| CN | 209486650 | U | 10/2019 |
| CN | 111258462 | A | 6/2020 |
| CN | 112328115 | A | 2/2021 |

OTHER PUBLICATIONS

Office Action issued on Dec. 15, 2021, in related Chinese Patent Application No. 202011270175.6, 12 pages.

Notice of Rejection issued on Jun. 7, 2022, in related Chinese Patent Application No. 202011270175.6, 11 pages.

* cited by examiner

TOUCH PANEL AND TOUCH DISPLAY DEVICE

CROSS-REFERENCE TO RELATED APPLICATIONS

This is a Continuation Application of U.S. patent application Ser. No. 18/168,809 which is a Continuation Application of International Patent Application No. PCT/CN2021/115200, filed on Aug. 30, 2021, which claims priority to Chinese Patent Application No. 202011270175.6 filed on Nov. 13, 2020, the disclosures of which are incorporated herein by reference in their entireties.

TECHNICAL FIELD

The present application relates to the field of display panel technologies and, in particular, to a touch panel and a touch display device.

BACKGROUND

With the development of touch technologies and the improvement of people's living standards, touch display devices have been widely applied. The thickness of a touch display device is increasingly thin. The distance between a touch panel and a display panel is increasingly small. In this case, the coupling capacitance of the touch panel to the display panel increases, which increases the influence of the noise of the display panel on the touch panel and affects the touch effect of the product.

SUMMARY

Embodiments of the present application provide a touch panel and a display device to reduce the influence of the noise of the display panel on the touch panel and resolve the issue that the touch control of the touch panel is insensitive or fails.

In a first aspect, embodiments of the present application provide a touch panel. The touch panel includes a plurality of touch electrodes disposed in the same layer.

A touch electrode includes a touch sensing region and a capacitance adjustment region.

The touch sensing region is configured to transmit a touch signal. The capacitance adjustment region is configured to reduce at least one of capacitance-to-ground of the touch electrode or coupling capacitance between two adjacent touch electrodes.

In a second aspect, embodiments of the present application provide a touch display device. The touch display device includes a layered display panel and a touch panel. The touch panel comprises a plurality of touch electrodes disposed in a same layer. A touch electrode comprises a touch sensing region and a capacitance adjustment region. The touch sensing region is configured to transmit a touch signal, and the capacitance adjustment region is configured to reduce at least one of capacitance-to-ground of the touch electrode or coupling capacitance between two adjacent touch electrodes.

According to embodiments of the present application, the touch panel includes a plurality of touch electrodes disposed in the same layer, a touch electrode includes a touch sensing region and a capacitance adjustment region, the touch sensing region is configured to transmit a touch signal, and the capacitance adjustment region is configured to reduce the capacitance-to-ground of the touch electrode and/or the coupling capacitance between two adjacent touch electrodes. The touch signal is transmitted through the touch sensing region of the touch electrode, and the arrangement of the capacitance adjustment region of the touch electrode reduces the area of the entire touch electrode, guaranteeing that the touch electrode has relatively small capacitance-to-ground, or reducing the coupling capacitance between two adjacent touch electrodes; or guaranteeing that the touch electrode has relatively small capacitance-to-ground, meanwhile, the coupling capacitance between two adjacent touch electrodes is relatively small. The arrangement of the capacitance adjustment region reduces the area of the touch electrode, reduces the coupling capacitance between adjacent touch electrodes, and thereby reduces the noise of a display panel coupled to the touch panel. Since a touch sensing signal is a signal generated by a finger touching the touch panel, the touch sensing signal is unchanged, so that the signal-to-noise ratio of a touch signal of the touch panel is relatively high, the capacitance-to-ground of the touch electrode is reduced, the noise of the display panel coupled to the touch panel is reduced. Therefore, the touch panel has relatively high touch sensitivity, the influence of the noise of the display panel on the touch panel is reduced, and the issue that the touch control of the touch panel is insensitive or fails is resolved.

DETAILED DESCRIPTION

Hereinafter the present application is described in detail in conjunction with the drawings and embodiments.

As mentioned in the background, the distance between a touch panel and a display panel is increasingly small, causing the coupling capacitance of the touch panel to the display panel to increase. The noise of the display panel to the touch panel increases, causing the signal-to-noise ratio of a touch signal of the touch panel to decrease, leading to the issue that the touch control of the touch panel is insensitive or fails, and affecting the touch effect of a touch product.

Figure 1:
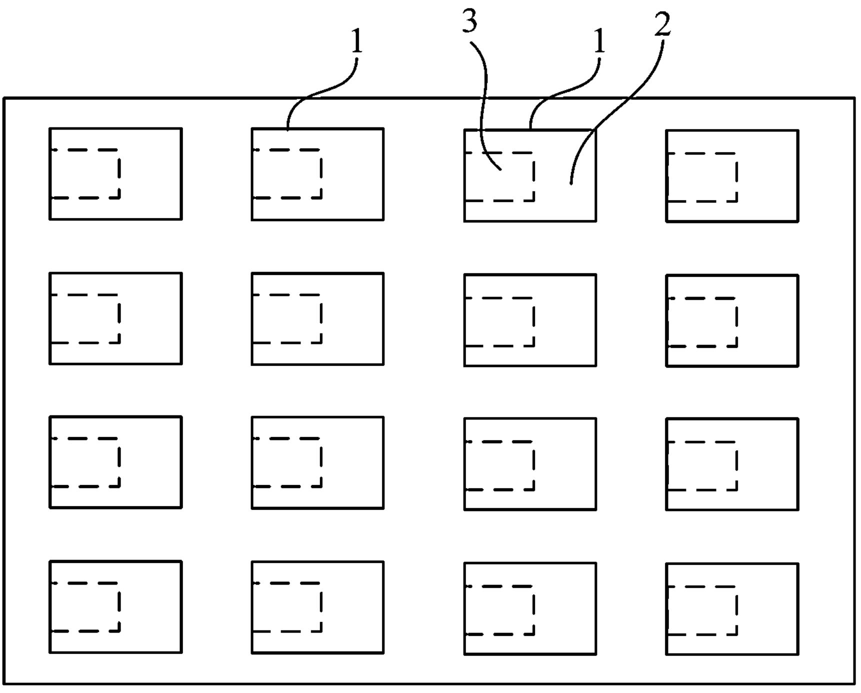
FIG. 1 is a structural view of a touch panel according to an embodiment of the present application.

FIG. 1 is a structural view of a touch panel according to an embodiment of the present application. Referring to FIG. 1, the touch panel according to this embodiment of the present application includes a plurality of touch electrodes 1 disposed in the same layer. A touch electrode 1 includes a touch sensing region 2 and a capacitance adjustment region 3. The touch sensing region 2 is configured to transmit a touch signal. The capacitance adjustment region 3 is configured to reduce the capacitance-to-ground of the touch electrode 1 and/or the coupling capacitance between two adjacent touch electrodes 1.

The plurality of touch electrodes 1 are disposed in the same layer, reducing the thickness of the touch panel and facilitating the reduction of the thickness of the display device. The capacitance adjustment region 3 may be hollowed out. The capacitance adjustment region 3 may be filled with an insulating layer or may be provided with a floating electrode inside. The floating electrode is not connected to and is insulated with an adjacent touch electrode. The capacitance adjustment region 3 may reduce the area of the entire touch electrode 1. The capacitance-to-ground may be formed between the touch electrode 1 and the display panel. For example, the capacitance-to-ground may be formed between the touch electrode 1 and a cathode of the display panel. The coupling capacitance exists between two adjacent touch electrodes 1. In this case, the arrangement of the capacitance adjustment region 3 which is hollowed out reduces the area of the touch electrode 1, reducing the capacitance-to-ground of the touch electrode 1, improving the touch sensitivity of the touch panel, reducing the coupling capacitance between adjacent touch electrodes 1, reducing a noise signal in the touch signal, and thereby improving the signal-to-noise ratio of the touch signal of the touch panel.

Exemplarily, the touch panel may be a self-capacitance touch panel or a mutual capacitance touch panel. FIG. 1 exemplarily illustrates the case where the touch panel is a self-capacitance touch panel. Referring to FIG. 1, the touch panel may be set as a self-capacitance touch panel. The capacitance-to-ground may be generated between the touch electrode 1 and the ground. The arrangement of the capacitance adjustment region 3 reduces the area of the touch electrode 1, reducing the capacitance-to-ground of the touch electrode 1, thereby reducing the noise of the display panel coupled to the touch panel, and improving the touch sensitivity of the touch panel.

Figure 2:
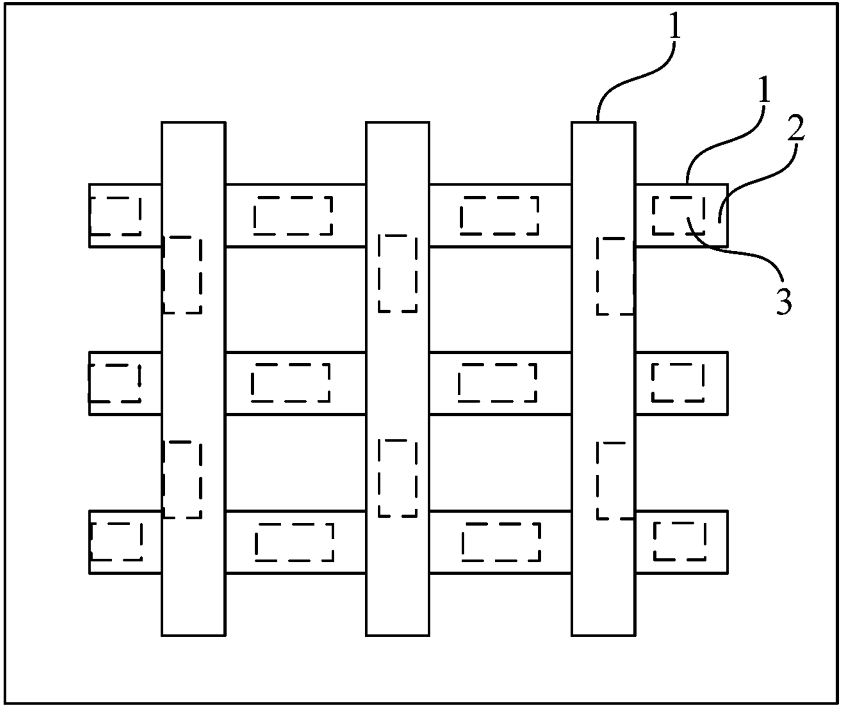
FIG. 2 is a structural view of another touch panel according to an embodiment of the present application.

FIG. 2 is a structural view of another touch panel according to an embodiment of the present application. FIG. 2 exemplarily illustrates the case where the touch panel is a mutual capacitance touch panel. Referring to FIG. 2, the touch panel may be set as a mutual capacitance touch panel. The touch electrodes 1 includes a first electrode and a second electrode. The coupling capacitance may be generated between adjacent touch electrodes 1. The capacitance-to-ground may also be generated between the touch electrode 1 and the ground. The arrangement of the capacitance adjustment region 3 reduces the area of the touch electrode 1, reducing the coupling capacitance between adjacent touch electrodes 1 and thereby reducing the noise of the display panel coupled to the touch panel. Since a touch sensing signal is a signal generated by a finger touching the touch panel, the touch sensing signal is unchanged, so that the signal-to-noise ratio of the touch signal of the touch panel can be relatively high, the capacitance-to-ground of the touch electrode 1 can be reduced, the noise of the display panel coupled to the touch panel can be reduced, and thereby the touch panel has relatively high touch sensitivity. It is to be noted that FIG. 2 does not illustrate a bridge between mutual capacitance touch electrodes 1.

The touch panel according to this embodiment transmits the touch signal through the touch sensing region of the touch electrode, and the arrangement of the capacitance adjustment region of the touch electrode guarantees that the touch electrode has relatively small capacitance-to-ground, or reduces the coupling capacitance between two adjacent touch electrodes, or guarantees that the touch electrode has both relatively small capacitance-to-ground and relatively small coupling capacitance, reducing the influence of the noise of the display panel on the touch panel, improving the touch sensitivity of the touch sensing region of the touch electrode, making the signal-to-noise ratio of the touch signal of the touch panel relatively high, resolving the issue that the touch control of the touch panel is insensitive or fails.

Figure 3:
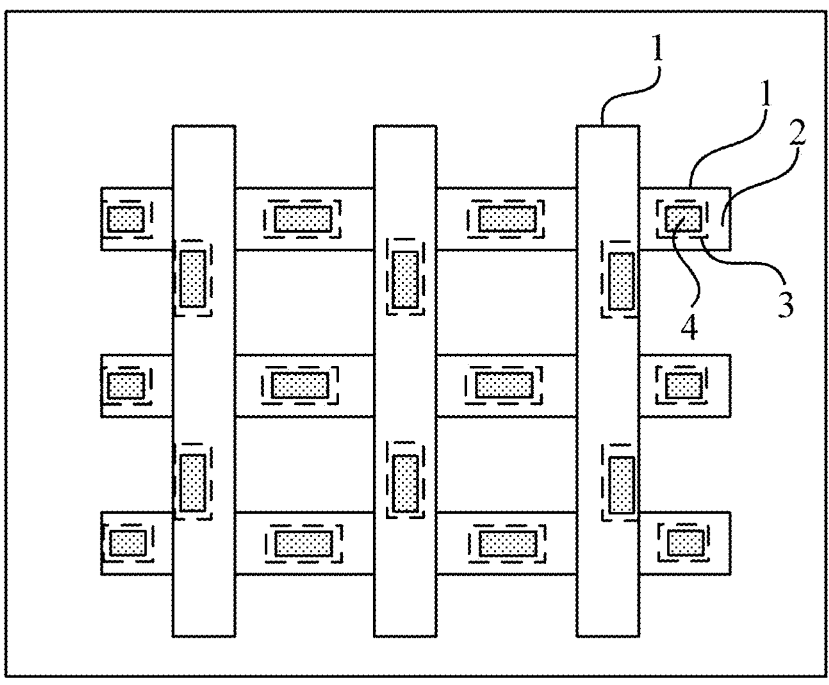
FIG. 3 is a structural view of another touch panel according to an embodiment of the present application.

In an embodiment, FIG. 3 is a structural view of another touch panel according to an embodiment of the present application. On the basis of the preceding embodiments, referring to FIG. 3, the capacitance adjustment region 3 is provided with an invalid electrode 4. The invalid electrode 4 is disposed in the same layer as the touch electrode 1 and is floated.

The invalid electrode 4 is disposed in the same layer as the touch electrode 1, so that the thickness of the touch panel may not increase. The invalid electrode 4 is floated, that is, the invalid electrode 4 is not connected to and is insulated with an adjacent touch electrode 1. In this case, the capacitance-to-ground cannot be generated between the invalid electrode 4 and the ground, and the coupling capacitance cannot be generated between the invalid electrode 4 and the adjacent touch electrode 1. Accordingly, the touch panel has a relatively small coupling capacitance and capacitance-to-ground. Additionally, since the touch electrode 1 is adjacent to a transparent cover plate, the arrangement in which the invalid electrode 4 is disposed in the capacitance adjustment region 3 may form an even metal layer in a layer where the touch electrode 1 is located so that grids formed by the capacitance adjustment region 3 of the touch electrode 1 and the touch sensing region 2 of the touch electrode 1 are not easily seen, making the touch panel have relatively good visual aesthetics.

Figure 4:
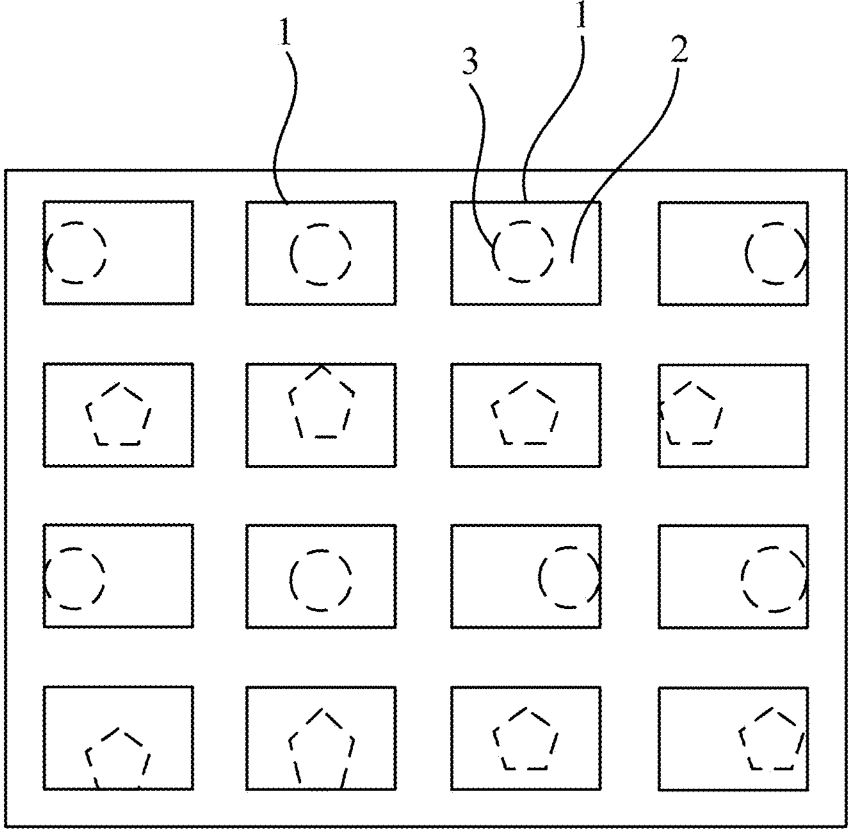
FIG. 4 is a structural view of another touch panel according to an embodiment of the present application.

In an embodiment, FIG. 4 is a structural view of another touch panel according to an embodiment of the present application. On the basis of the preceding embodiments, referring to FIG. 4, the touch sensing region 2 is disposed around the capacitance adjustment region 3.

Such an arrangement guarantees a relatively small coupling capacitance of the touch sensing region 2 and enables a signal transmission path of the touch sensing region 2 to form a closed loop, improving the strength of the touch sensing signal and thereby improving the signal-to-noise ratio of the touch sensing signal.

Figure 5:
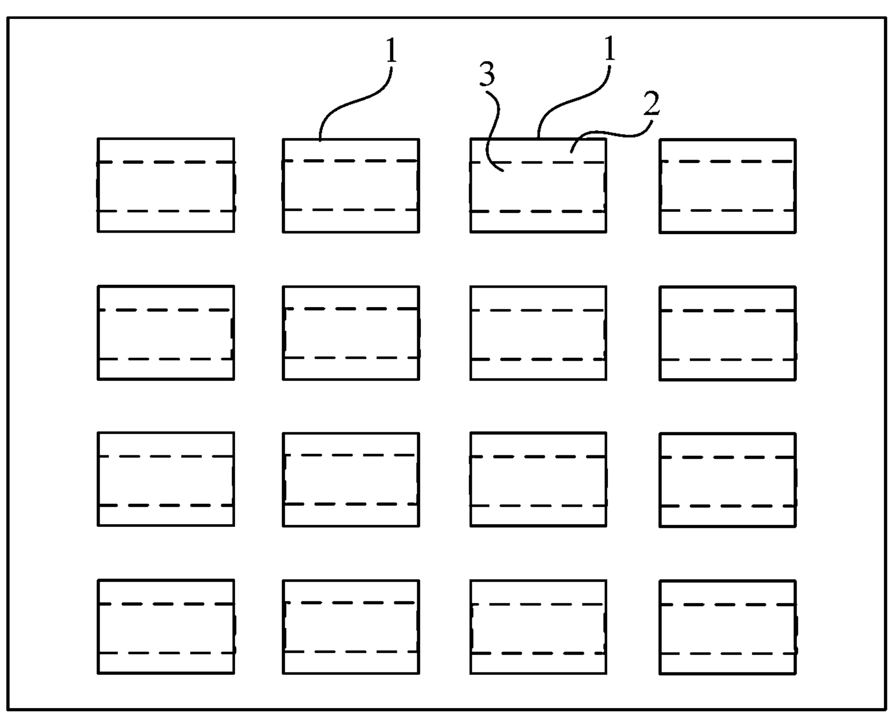
FIG. 5 is a structural view of another touch panel according to an embodiment of the present application.

In an embodiment, the shape of the touch electrode 1 may be at least one of a rectangular block, a strip, a triangle, or another irregular shape and may be set according to actual needs of the touch panel. The shape of the capacitance adjustment region 3 may be the same as or different from the shape of the touch electrode 1. FIG. 4 exemplarily illustrates the case where the shape of the capacitance adjustment region 3 is different from the shape of the touch electrode 1 and where a plurality of capacitance adjustment regions 3 have different shapes. The shape of the capacitance adjustment region 3 and the shape of the touch electrode 1 may be set according to needs and are not limited here. FIG. 5 is a structural view of another touch panel according to an embodiment of the present application. On the basis of the preceding embodiments, FIG. 5 exemplarily illustrates the case where the shape of the capacitance adjustment region 3 is the same as the shape of the touch electrode 1. The shape of the capacitance adjustment region 3 is set to be the same as the shape of the touch electrode 1. In this case, when the touch electrode 1 is manufactured, the touch sensing region 2 is more easily disposed around the capacitance adjustment region 3, facilitating the manufacture of the touch electrode 1.

Figure 6:
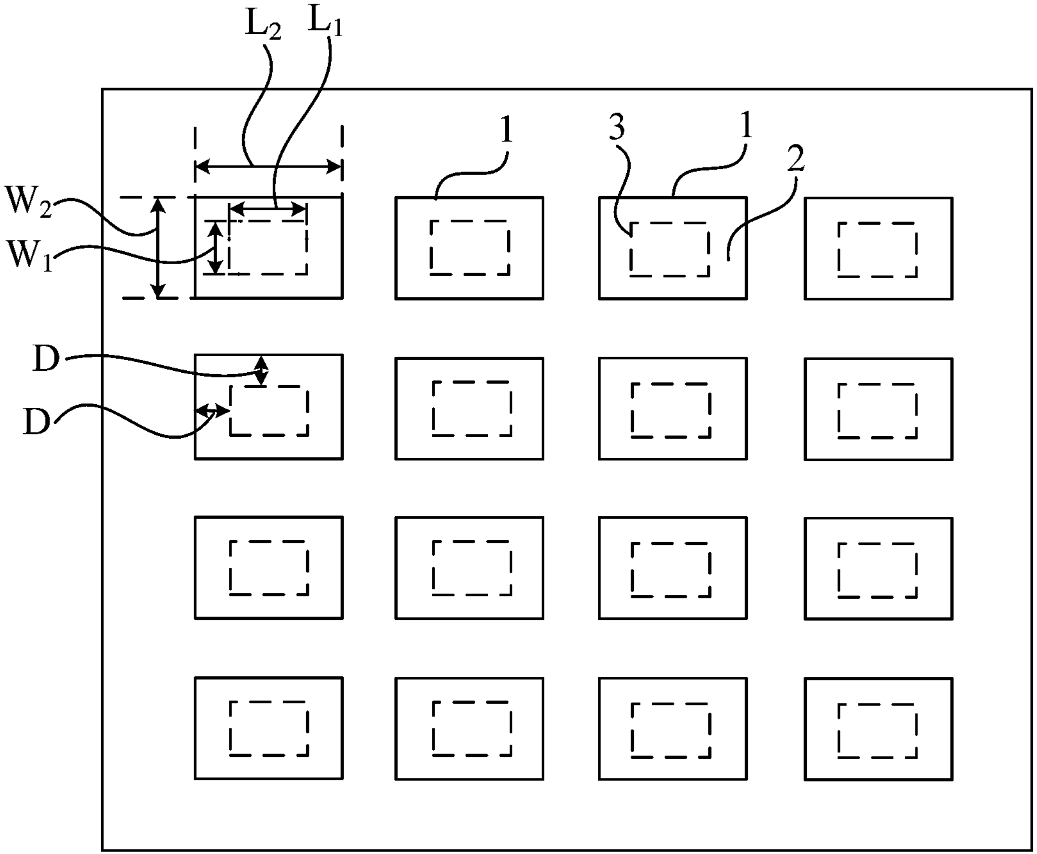
FIG. 6 is a structural view of another touch panel according to an embodiment of the present application.

In an embodiment, FIG. 6 is a structural view of another touch panel according to an embodiment of the present application. On the basis of the preceding embodiments, referring to FIG. 6, a first length $L_1$ of the capacitance adjustment region 3 is smaller than a second length $L_2$ of the touch sensing region 2. The first length $L_1$ is the size of a long side of the capacitance adjustment region 3. The second length $L_2$ is the size of a long side of the touch sensing region 2. A first width $W_1$ of the capacitance adjustment region 3 is smaller than a second width $W_2$ of the touch sensing region 2. The first width $W_1$ is the size of a short side of the capacitance adjustment region 3. The second width $W_2$ is the size of a short side of the touch sensing region 2.

Such an arrangement enables the signal transmission path of the touch sensing region 2 to form a closed loop and makes the transmission of the touch sensing signal on the touch electrode 1 more even, improving the strength of the touch sensing signal, reducing the loss of the touch sensing signal in the transmission process, improving the signal-to-noise ratio of the touch sensing signal, and improving the touch effect of the touch panel.

In an embodiment, on the basis of the preceding embodiments, referring to FIG. 6, a distance D between a side of the touch sensing region 2 adjacent to a side of the capacitance adjustment region 3 and the corresponding side of the capacitance adjustment region 3 is greater than or equal to 50 μm. The first width $W_1$ is in the range of 150 μm to 300 μm.

Figure 7:
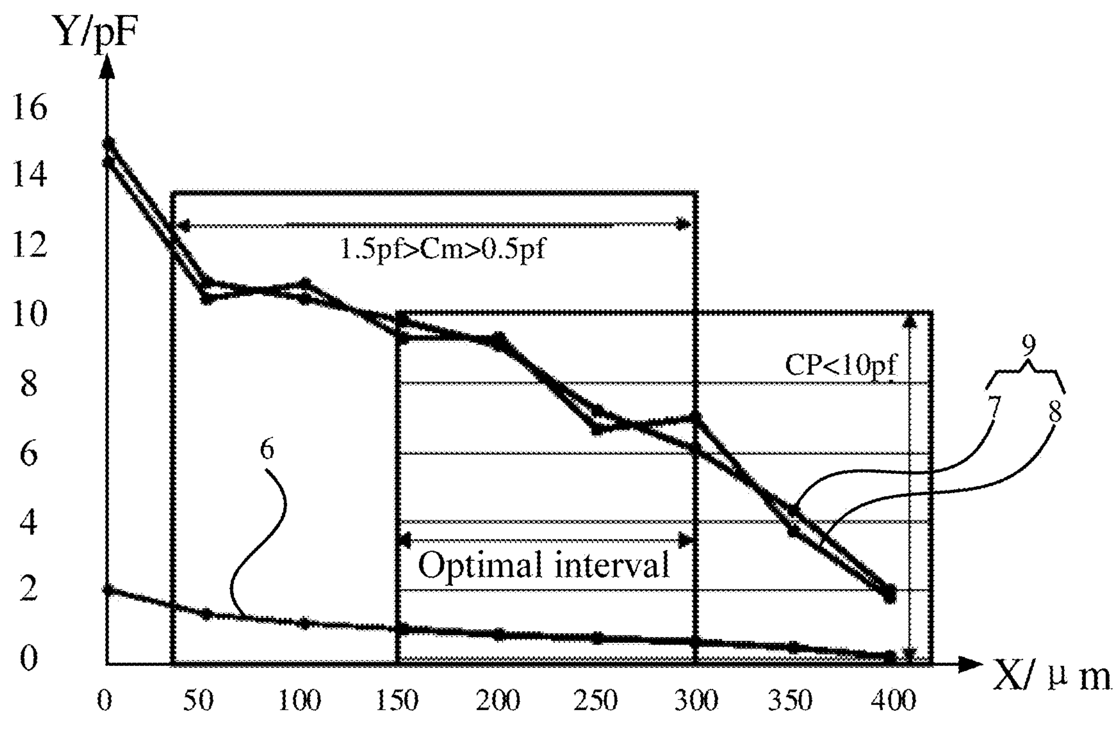
FIG. 7 is a graph illustrating that capacitance-to-ground of a touch electrode and coupling capacitance vary with a first width.

The excessively large capacitance-to-ground of the touch electrode 1 and the excessively large coupling capacitance may amplify the noise and thereby reduce the signal-to-noise ratio of the touch sensing signal. The excessively small capacitance-to-ground of the touch electrode 1 and the excessively small coupling capacitance may affect the strength of the touch sensing signal and affect the sensitivity of touch sensing. Thus, the first length $L_1$ of the capacitance adjustment region 3 may be set to be unchanged, and the first width $W_1$ is set to be in the range of 150 μm to 300 μm, for example, 180 μm, 200 μm, 220 μm, or 250 μm. In this case, the capacitance-to-ground of the touch electrode 1 and the coupling capacitance are each in the appropriate range, guaranteeing that the touch electrode 1 has a relatively high signal-to-noise ratio and improving the touch sensitivity of the touch panel. Exemplarily, FIG. 7 is a graph illustrating that the capacitance-to-ground of the touch electrode and the coupling capacitance vary with the first width. Referring to FIG. 7, an X axis represents the first width $W_1$, and a Y axis represents a capacitance value. When the first width $W_1$ is greater than 50 μm and smaller than 300 μm, the coupling capacitance 6 (referring to curve 6 in FIG. 7) between adjacent touch electrodes 1 is greater than 0.5 pF and smaller than 1.5 pF. When the coupling capacitance is excessively small, the touch signal is difficult to identify in the case of a relatively small variation of the touch signal. When the coupling capacitance is excessively large, the noise is relatively large, the relative noise of the touch signal is relatively small, and the signal-to-noise ratio of the touch signal is relatively low. When the first width $W_1$ is greater than 150 μm and smaller than 400 μm, the capacitance-to-ground 9 (referring to curve 9 in FIG. 7) of the touch electrode 2 is smaller than 10 pF, resulting in relatively small capacitance-to-ground and relatively small noise of the touch signal. The first width $W_1$ is set to be in the range of 150 μm to 300 μm, enabling the coupling capacitance and the capacitance-to-ground to be each in the appropriate range, guaranteeing a relatively high sensitivity of the touch sensing signal, and improving the touch effect.

Figure 8:
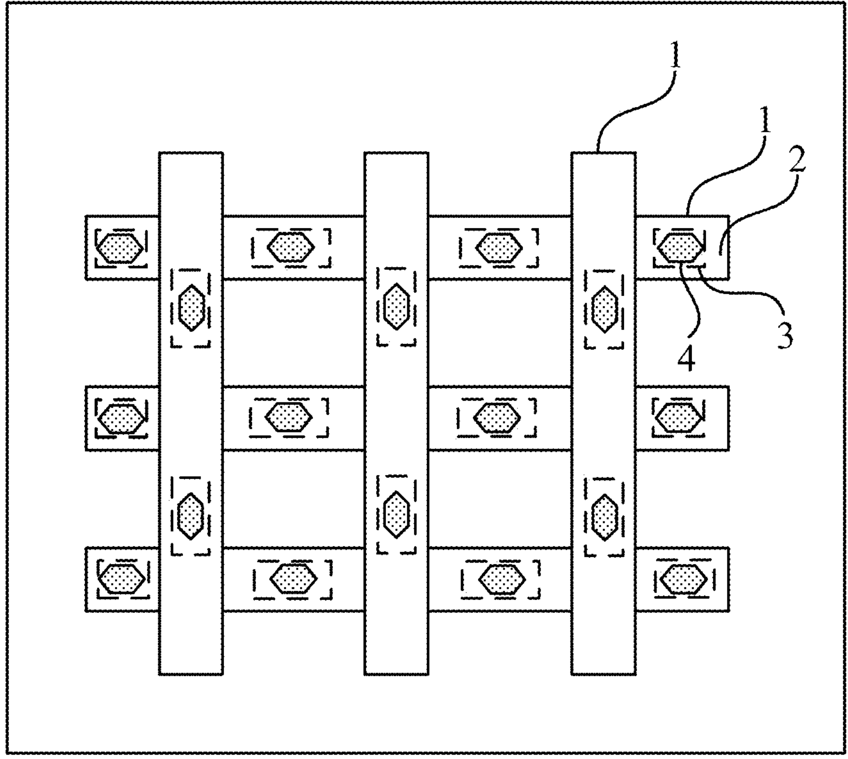
FIG. 8 is a structural view of another touch panel according to an embodiment of the present application.

In an embodiment, FIG. 8 is a structural view of another touch panel according to an embodiment of the present application. On the basis of the preceding embodiments, referring to FIG. 8, the shape of the invalid electrode 4 may include at least one of a rectangle, a triangle, a regular hexagon, or a circle.

The shape of the invalid electrode 4 may be set according to the shape of the capacitance adjustment region 3 and may also be set according to the needs of the touch sensing signal. It is to be noted that FIG. 8 exemplarily illustrates the case where the invalid electrode 4 is a hexagon, which is not a limit to the invalid electrode 4.

In an embodiment, the capacitance adjustment region 3 may be located at an edge of the touch sensing region 2.

Figure 9:
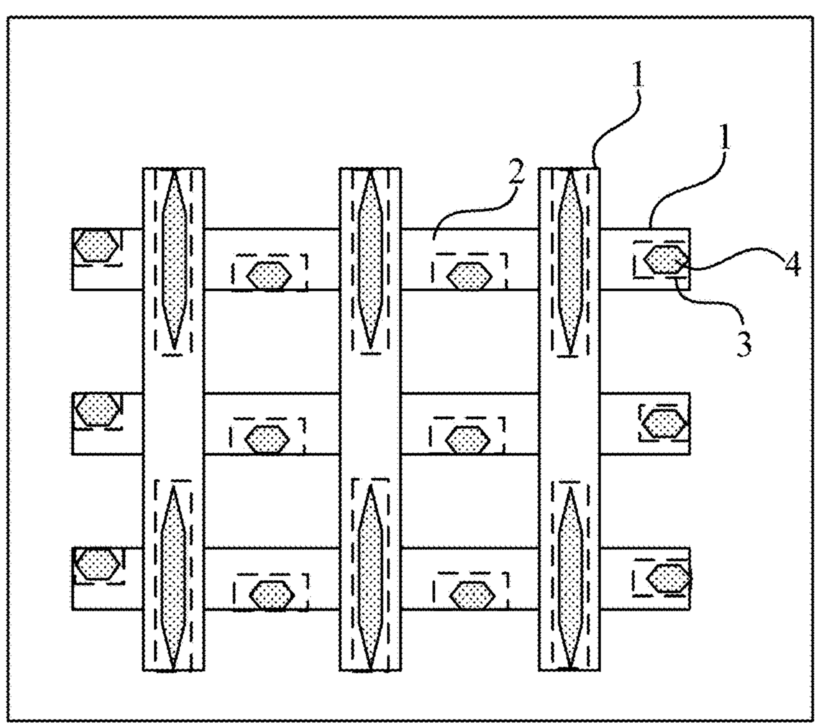
FIG. 9 is a structural view of another touch panel according to an embodiment of the present application.

FIG. 9 is a structural view of another touch panel according to an embodiment of the present application. On the basis of the preceding embodiments, referring to FIG. 9, the capacitance adjustment region 3 is disposed at the edge of the touch sensing region 2 so that the invalid electrode 4 is also disposed at the edge of the touch sensing region 2, not affecting the transmission of the touch sensing signal in a main position of the touch sensing region 2. The arrangement in which the capacitance adjustment region 3 is disposed at the edge of the touch sensing region 2 may reduce the number of sides of the capacitance adjustment region 3 adjacent to the touch sensing region 2. When the invalid electrode 4 is manufactured in the capacitance adjustment region 3, the insulation between the invalid electrode 4 and the touch electrode 1 is more easily implemented, facilitating the manufacture of the invalid electrode 4.

In an embodiment, the touch panel may be a mutual capacitance touch panel or a self-capacitance touch panel. The touch panel may be a mutual capacitance touch panel. The touch electrodes 1 include a first electrode 11 and a second electrode 12. The first electrode 11 includes the touch sensing region 2 and the capacitance adjustment region 3; and/or the second electrode 12 includes the touch sensing region 2 and the capacitance adjustment region 3.

Figure 10:
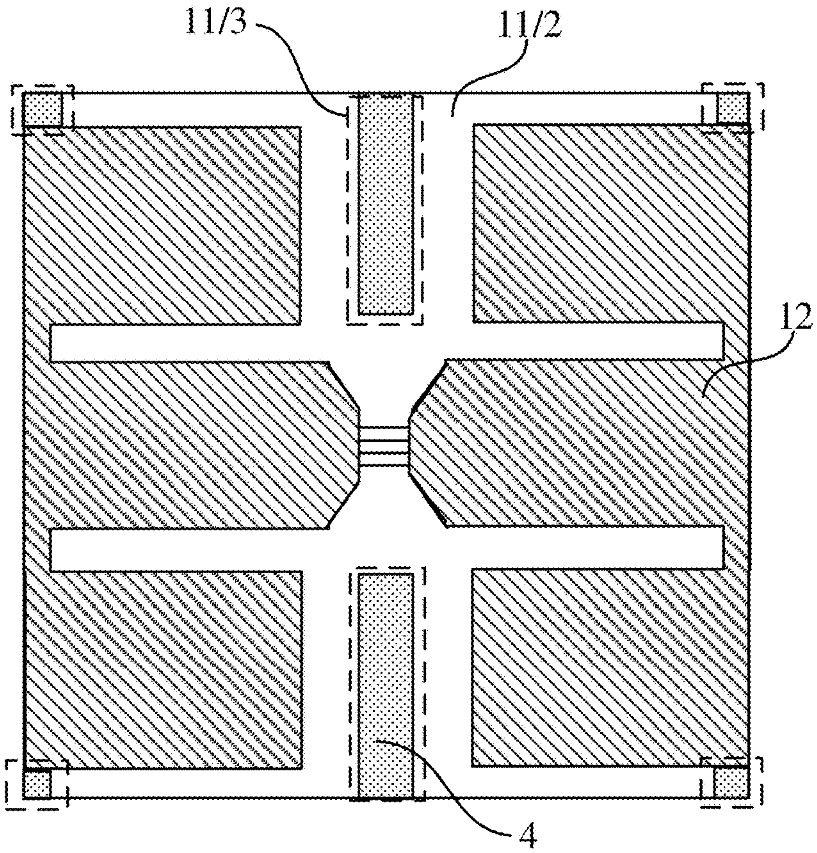
FIG. 10 is a structural view of another touch panel according to an embodiment of the present application.

FIG. 10 is a structural view of another touch panel according to an embodiment of the present application. On the basis of the preceding embodiments, referring to FIGS. 7 and 10, the touch panel is a mutual capacitance touch panel. The touch electrodes 1 include the first electrode 11 and the second electrode 12. The first electrode 11 includes the touch sensing region 2 and the capacitance adjustment region 3. Such an arrangement reduces the area of the first electrode 11, reducing the capacitance-to-ground 7 of the first electrode 11, reducing the coupling capacitance 6 between the first electrode 11 and the second electrode 12, reducing the noise of the touch sensing signal, thereby reducing the noise of the display panel coupled to the touch panel, and improving the touch sensitivity of the touch panel.

Figure 11:
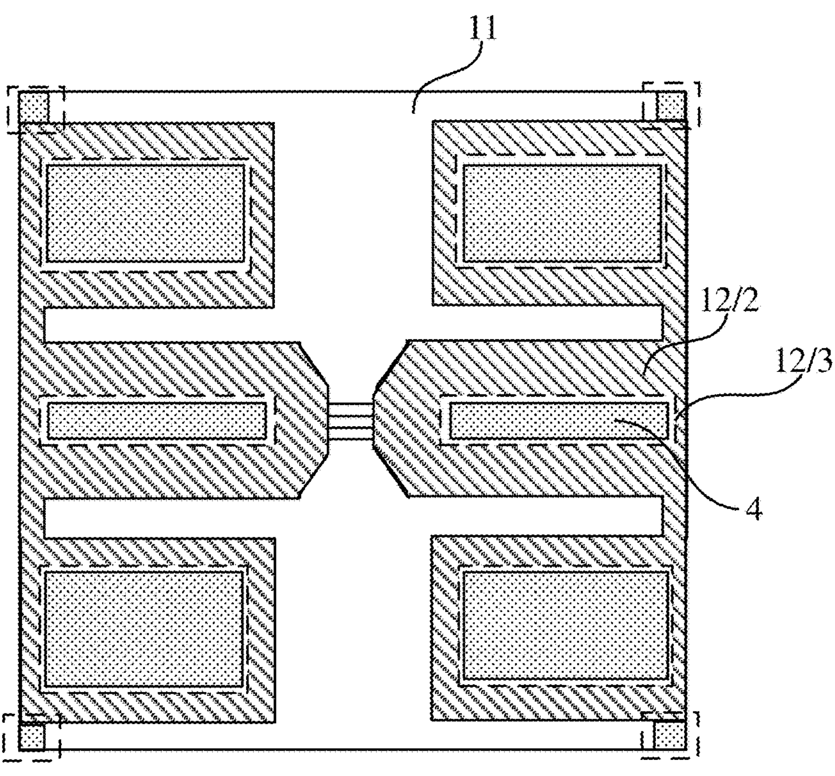
FIG. 11 is a structural view of another touch panel according to an embodiment of the present application.

FIG. 11 is a structural view of another touch panel according to an embodiment of the present application. On the basis of the preceding embodiments, referring to FIGS. 7 and 11, the touch panel is a mutual capacitance touch panel. The touch electrodes 1 include the first electrode 11 and the second electrode 12. The second electrode 12 includes the touch sensing region 2 and the capacitance adjustment region 3. Such an arrangement reduces the area of the second electrode 12, reducing the capacitance-to-ground 8 of the second electrode 12, reducing the coupling capacitance 6 between the second electrode 12 and the first electrode 11, thereby reducing the noise of the display panel coupled to the touch panel, and improving the touch sensitivity of the touch panel.

Figure 12:
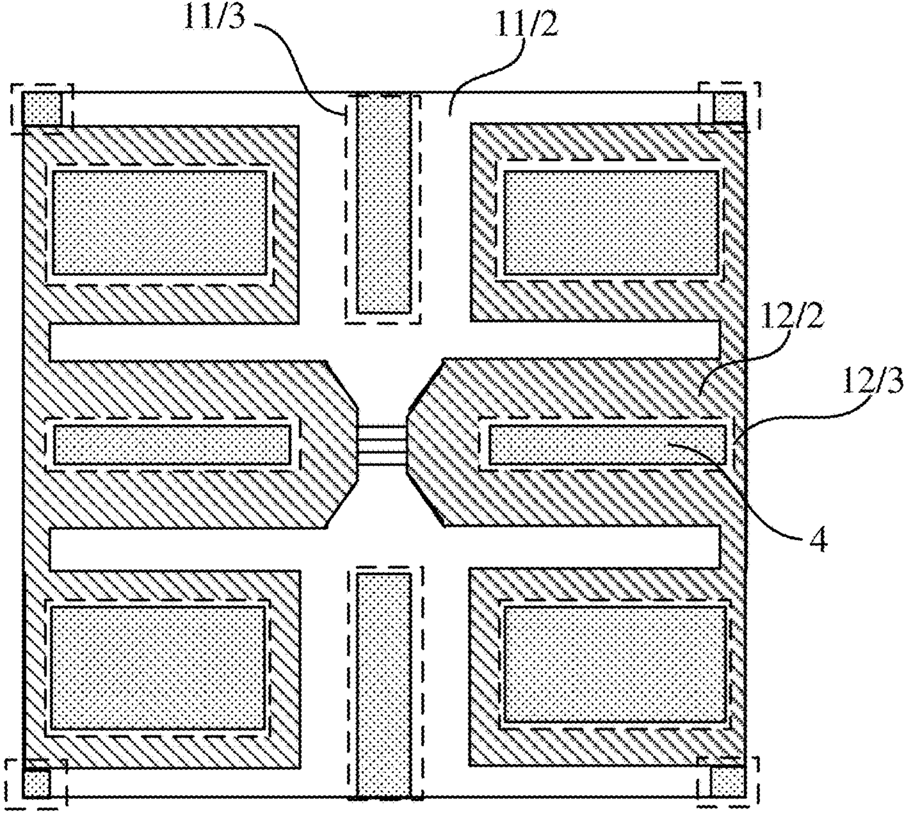
FIG. 12 is a structural view of another touch panel according to an embodiment of the present application.

FIG. 12 is a structural view of another touch panel according to an embodiment of the present application. On the basis of the preceding embodiments, referring to FIGS. 7 and 12, the touch panel is a mutual capacitance touch panel. The touch electrodes 1 include the first electrode 11 and the second electrode 12. The first electrode 11 includes the touch sensing region 2 and the capacitance adjustment region 3, and the second electrode 12 includes the touch sensing region 2 and the capacitance adjustment region 3. Such an arrangement reduces the area of the first electrode 11 and the area of the second electrode 12, reducing the capacitance-to-ground 7 of the first electrode 11 and the capacitance-to-ground 8 of the second electrode 12 respectively, reducing the coupling capacitance 6 between the second electrode 12 and the first electrode 11, thereby reducing the noise of the display panel coupled to the touch panel, improving the signal-to-noise ratio of the touch sensing signal greatly in the case where the touch sensing signal is unchanged, improving the touch sensitivity of the touch panel, reducing the effect of the noise of the display panel on the touch panel, and resolving the issue that the touch control of the touch panel is insensitive or fails.

Figure 13:
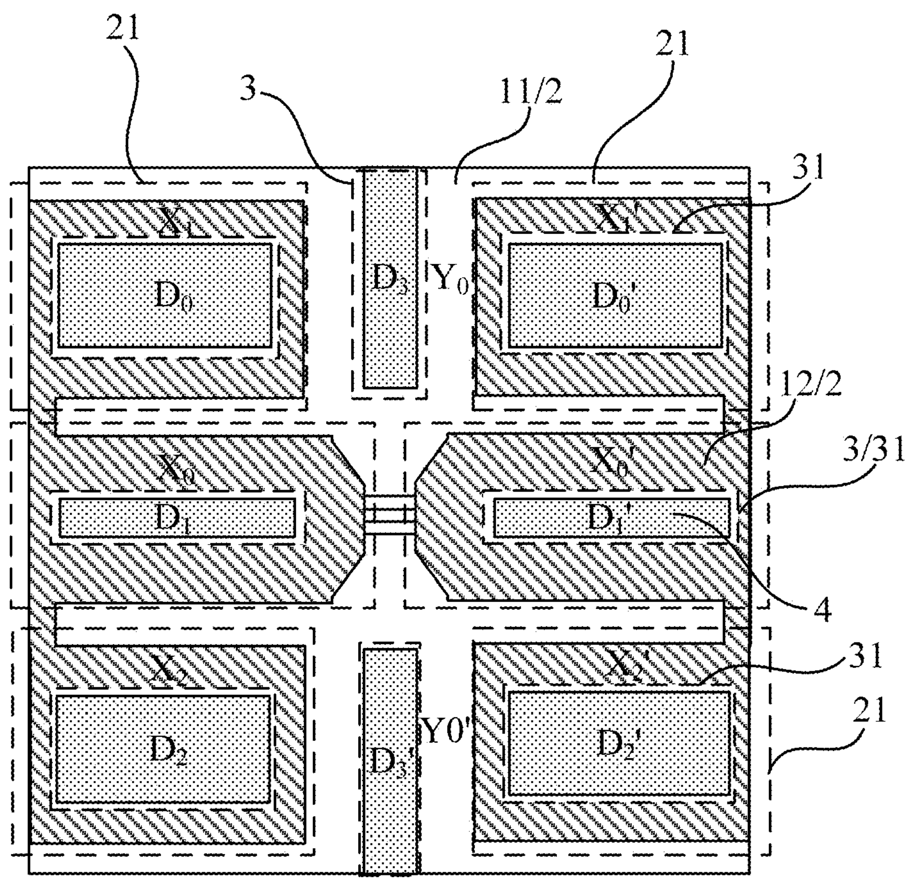
FIG. 13 is a structural view of another touch panel according to an embodiment of the present application.

In an embodiment, FIG. 13 is a structural view of another touch panel according to an embodiment of the present application. On the basis of the preceding embodiments, referring to FIG. 13, the touch sensing region 2 includes at least two touch sensing sub-regions 21, the capacitance adjustment region 3 includes at least two capacitance adjustment sub-regions 31, and each touch sensing sub-region 21 is correspondingly provided with at least one capacitance adjustment sub-region 31.

Each touch sensing sub-region 21 is correspondingly provided with at least one capacitance adjustment sub-region 31. In this case, the capacitance-to-ground of each touch sensing sub-region 21 can be reduced so that the capacitance-to-ground of the touch sensing region 2 composed of a plurality of touch sensing sub-regions 21 is as small as possible, improving the signal-to-noise ratio of the touch sensing signal and enabling each region of the touch panel to have a relatively good touch effect. It is to be noted that FIG. 13 exemplarily illustrates the case where each touch sensing sub-region 21 is correspondingly provided with one capacitance adjustment sub-region 31. Each touch sensing sub-region 21 may also be correspondingly provided with a plurality of capacitance adjustment sub-regions 31, which is not repeated here.

Exemplarily, referring to FIG. 13, the first electrode 11 may include two touch sensing sub-regions 21, that is, a first touch sensing sub-region $Y_0$ and a second touch sensing sub-region $Y_0'$. The second electrode 12 may include six touch sensing sub-regions 21, that is, a third touch sensing sub-region $X_0$, a fourth touch sensing sub-region $X_0'$, a fifth touch sensing sub-region $X_1$, a sixth touch sensing sub-region $X_1'$, a seventh touch sensing sub-region $X_2$, and an eighth touch sensing sub-region $X_2'$. Each touch sensing sub-region 21 may be correspondingly provided with one capacitance adjustment sub-region 31. Moreover, each capacitance adjustment sub-region 31 may include one invalid electrode 4. Referring to FIG. 13, the first touch sensing sub-region $Y_0$ and the second touch sensing sub-region $Y_0'$ are correspondingly provided with a first invalid electrode $D_3$ and a second invalid electrode $D_3'$ respectively. The third touch sensing sub-region $X_0$ and the fourth touch sensing sub-region $X_0'$ are correspondingly provided with a third invalid electrode $D_1$ and a fourth invalid electrode $D_1'$ respectively. The fifth touch sensing sub-region $X_1$ and the sixth touch sensing sub-region $X_1'$ are correspondingly provided with a fifth invalid electrode $D_0$ and a sixth invalid electrode $D_0'$ respectively. The seventh touch sensing sub-region $X_2$ and the eighth touch sensing sub-region $X_2'$ are correspondingly provided with a seventh invalid electrode $D_2$ and an eighth invalid electrode $D_2'$ respectively.

A third width of the first invalid electrode $D_3$, a third width of the second invalid electrode $D_3'$, a third width of the third invalid electrode $D_1$, a third width of the fourth invalid electrode $D_1'$, a third width of the fifth invalid electrode $D_0$, a third width of the sixth invalid electrode $D_0'$, a third width of the seventh invalid electrode $D_2$ and a third width of the eighth invalid electrode $D_2'$ may be adjusted so as to adjust the area of corresponding invalid electrodes, thereby adjusting the area of the first electrode in a corresponding region and the area of the second electrode in a corresponding region, and thus adjusting the capacitance-to-ground between the first electrode and the second electrode as well as the coupling capacitance between the first electrode and the second electrode.

Figure 14:
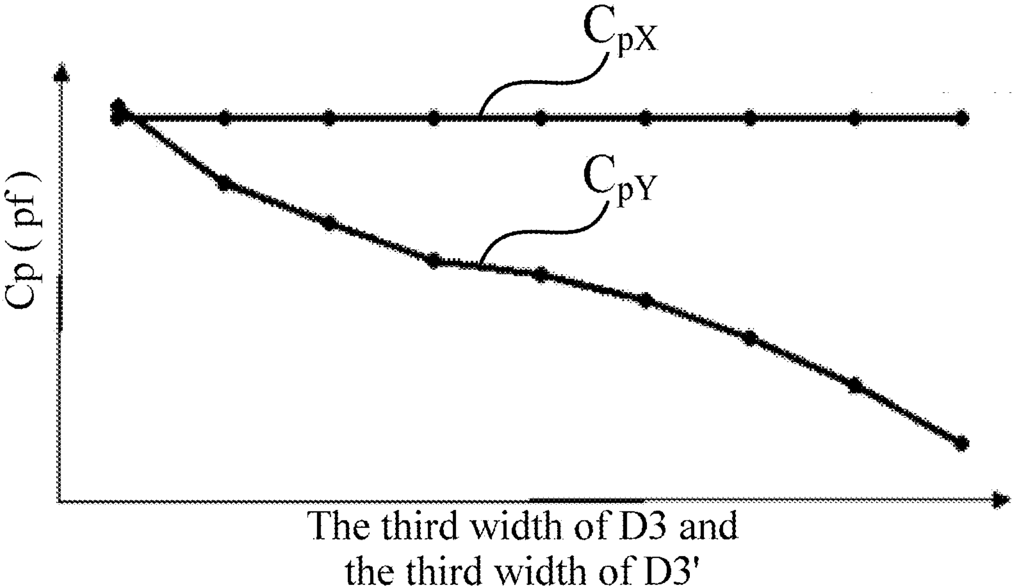
FIG. 14 is a graph illustrating that capacitance-to-ground $C_{pY}$ of a first electrode and capacitance-to-ground $C_{pX}$ of a second electrode vary with a third width of $D_3$ and a third width of $D_3'$ according to an embodiment of the present application.
Figure 15:
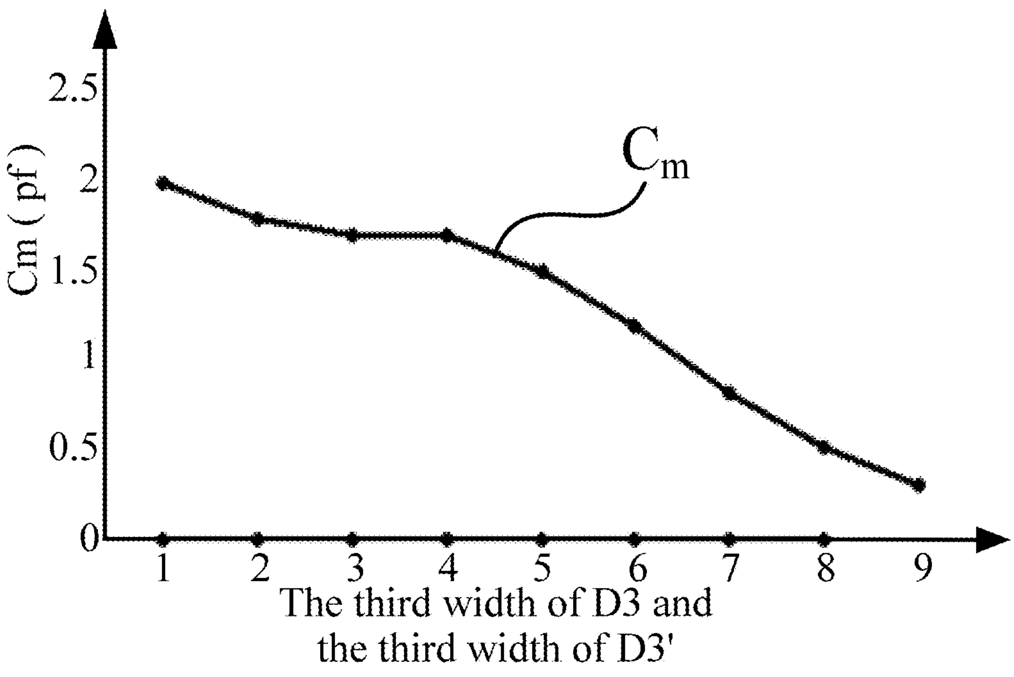
FIG. 15 is a graph illustrating that coupling capacitance $C_m$ between a first electrode and a second electrode varies with a third width of $D_3$ and a third width of $D_3'$ according to an embodiment of the present application.

Exemplarily, FIG. 14 is a graph illustrating that the capacitance-to-ground $C_{pY}$ of the first electrode and the capacitance-to-ground $C_{pX}$ of the second electrode vary with the third width of $D_3$ and the third width of $D_3$' according to an embodiment of the present application. FIG. 15 is a graph illustrating that the coupling capacitance $C_m$ between the first electrode and the second electrode varies with the third width of $D_3$ and the third width of $D_3$' according to an embodiment of the present application. On the basis of the preceding embodiments, referring to FIGS. 13 and 15, in the case where a third length of the first invalid electrode $D_3$ and a third length of the second invalid electrode $D_3$' are unchanged, with the third width of the first invalid electrode $D_3$ and the third width of the second invalid electrode $D_3$' increasing, the area of the first invalid electrode $D_3$ and the area of the second invalid electrode $D_3$' increase. In this case, the area of the first touch sensing sub-region $Y_0$ of the first electrode 11 and the area of the second touch sensing sub-region $Y_0$' of the first electrode 11 reduce, the capacitance-to-ground $C_{pY}$ of the first electrode 11 reduces, the capacitance-to-ground $C_{pX}$ of the second electrode 12 is constant, and the coupling capacitance $C_m$ between the first electrode 11 and the second electrode 12 reduces.

Figure 16:
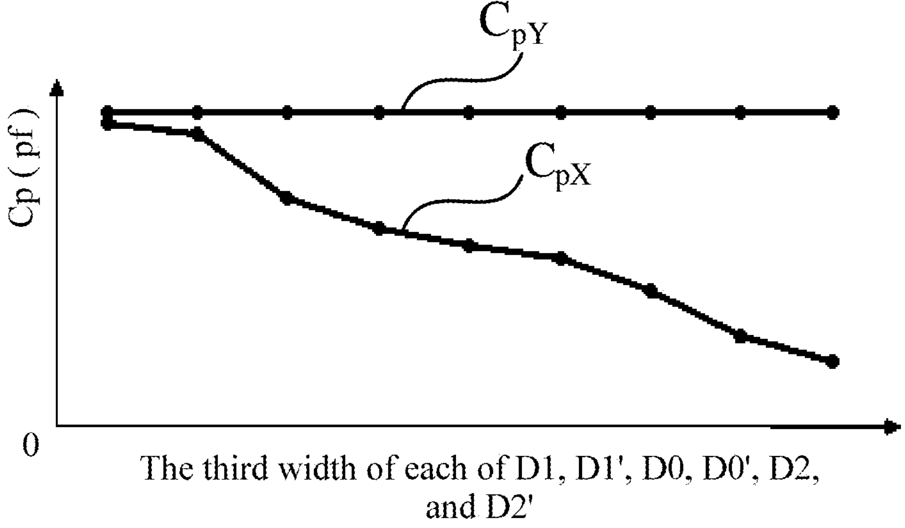
FIG. 16 is a graph illustrating that capacitance-to-ground $C_{pY}$ of a first electrode and capacitance-to-ground $C_{pX}$ of a second electrode vary with a third width of $D_1$, a third width of $D_1'$, a third width of $D_0$, a third width of $D_0'$, a third width of $D_2$, and a third width of $D_2'$ according to an embodiment of the present application.
Figure 17:
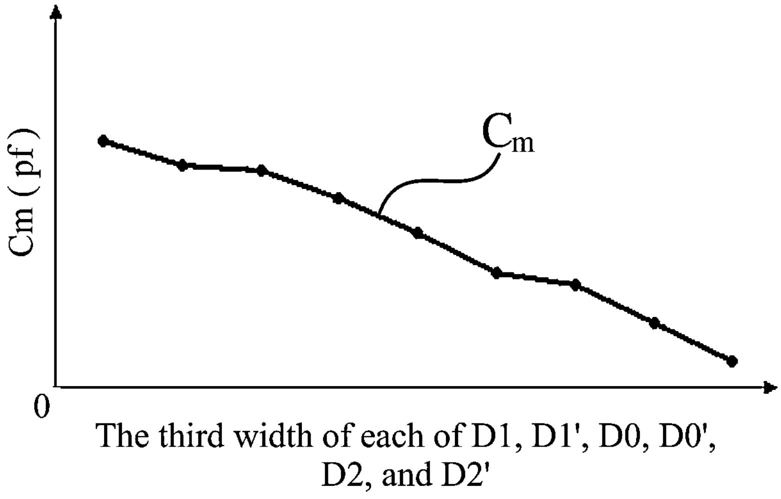
FIG. 17 is a graph illustrating that coupling capacitance $C_m$ between a first electrode and a second electrode varies with a third width of $D_1$, a third width of $D_1'$, a third width of $D_0$, a third width of $D_0'$, a third width of $D_2$, and a third width of $D_2'$ according to an embodiment of the present application.

FIG. 16 is a graph illustrating that the capacitance-to-ground $C_{pY}$ of the first electrode and the capacitance-to-ground $C_{pX}$ of the second electrode vary with the third width of $D_1$, the third width of $D_1$', the third width of $D_0$, the third width of $D_0$', the third width of $D_2$, and the third width of $D_2$' according to an embodiment of the present application. FIG. 17 is a graph illustrating that the coupling capacitance $C_m$ between the first electrode and the second electrode varies with the third width of $D_1$, the third width of $D_1$', the third width of $D_0$, the third width of $D_0$', the third width of $D_2$, and the third width of $D_2$' according to an embodiment of the present application. On the basis of the preceding embodiments, referring to FIGS. 13, 16, and 17, in the case where a third length of the third invalid electrode $D_1$, a third length of the fourth invalid electrode $D_1$', a third length of the fifth invalid electrode $D_0$, a third length of the sixth invalid electrode $D_0$', a third length of the seventh invalid electrode $D_2$, and a third length of the eighth invalid electrode $D_2$' are unchanged, with the third width of the third invalid electrode $D_1$, the third width of the fourth invalid electrode $D_1$', the third width of the fifth invalid electrode $D_0$, the third width of the sixth invalid electrode $D_0$', the third width of the seventh invalid electrode $D_2$, and the third width of the eighth invalid electrode $D_2$' increasing, the area of the third invalid electrode $D_1$, the area of the fourth invalid electrode $D_1$', the area of the fifth invalid electrode $D_0$, the area of the sixth invalid electrode $D_0$', the area of the seventh invalid electrode $D_2$, and the area of the eighth invalid electrode $D_2$' increase. In this case, the area of the third touch sensing sub-region $X_0$ of the second electrode 12, the area of the fourth touch sensing sub-region $X_0$' of the second electrode 12, the area of the fifth touch sensing sub-region $X_1$ of the second electrode 12, the area of the sixth touch sensing sub-region $X_1$' of the second electrode 12, the area of the seventh touch sensing sub-region $X_2$ of the second electrode 12, and the area of the eighth touch sensing sub-region $X_2$' of the second electrode 12 reduce; the capacitance-to-ground $C_{pY}$ of the first electrode 11 is constant; the capacitance-to-ground $C_{pX}$ of the second electrode 12 reduces; and the coupling capacitance $C_m$ between the first electrode 11 and the second electrode 12 reduces.

Figure 18:
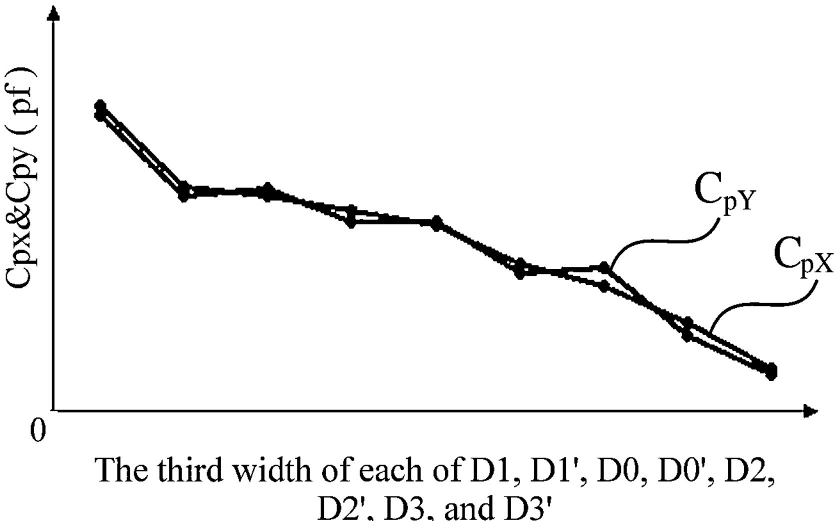
FIG. 18 is a graph illustrating that capacitance-to-ground $C_{pY}$ of a first electrode and capacitance-to-ground $C_{pX}$ of a second electrode vary with a third width of $D_1$, a third width of $D_1'$, a third width of $D_0$, a third width of $D_0'$, a third width of $D_2$, a third width of $D_2'$, a third width of $D_3$, and a third width of $D_3'$ according to an embodiment of the present application.
Figure 19:
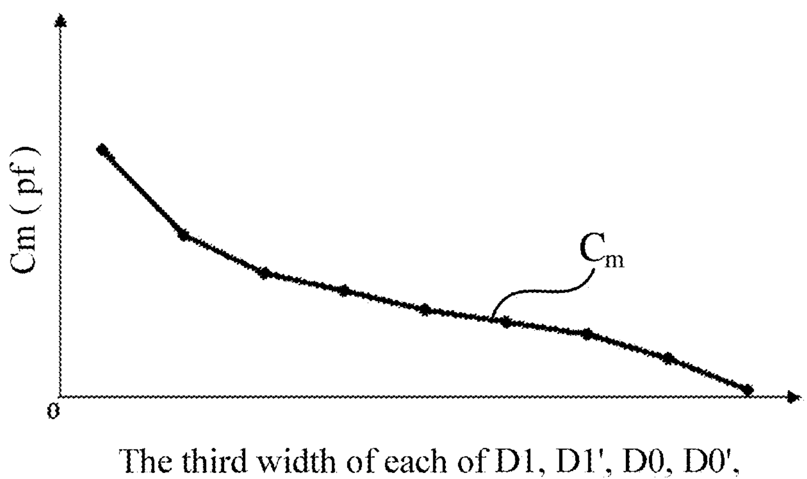
FIG. 19 is a graph illustrating that coupling capacitance $C_m$ between a first electrode and a second electrode varies with a third width of $D_1$, a third width of $D_1'$, a third width of $D_0$, a third width of $D_0'$, a third width of $D_2$, a third width of $D_2'$, a third width of $D_3$, and a third width of $D_3'$ according to an embodiment of the present application.

FIG. 18 is a graph illustrating that the capacitance-to-ground $C_{pY}$ of the first electrode and the capacitance-to-ground $C_{pX}$ of the second electrode vary with the third width of $D_1$, the third width of $D_1$', the third width of $D_0$, the third width of $D_0$', the third width of $D_2$, the third width of $D_2$', the third width of $D_3$, and the third width of $D_3$' according to an embodiment of the present application. FIG. 19 is a graph illustrating that the coupling capacitance $C_m$ between the first electrode and the second electrode varies with the third width of $D_1$, the third width of $D_1$', the third width of $D_0$, the third width of $D_0$', the third width of $D_2$, the third width of $D_2$', the third width of $D_3$, and the third width of $D_3$' according to an embodiment of the present application. On the basis of the preceding embodiments, referring to FIGS. 13, 18, and 19, in the case where a third length of the first invalid electrode $D_3$, a third length of the second invalid electrode $D_3$', the third length of the third invalid electrode $D_1$, the third length of the fourth invalid electrode $D_1$', the third length of the fifth invalid electrode $D_0$, the third length of the sixth invalid electrode $D_0$', the third length of the seventh invalid electrode $D_2$, and the third length of the eighth invalid electrode $D_2$' are unchanged, with the third width of the first invalid electrode $D_3$, the third width of the second invalid electrode $D_3$', the third width of the third invalid electrode $D_1$, the third width of the fourth invalid electrode $D_1$', the third width of the fifth invalid electrode $D_0$, the third width of the sixth invalid electrode $D_0$', the third width of the seventh invalid electrode $D_2$, and the third width of the eighth invalid electrode $D_2$' increasing, the area of the first invalid electrode $D_3$, the area of the second invalid electrode $D_3$', the area of the third invalid electrode $D_1$, the area of the fourth invalid electrode $D_1$', the area of the fifth invalid electrode $D_0$, the area of the sixth invalid electrode $D_0$', the area of the seventh invalid electrode $D_2$, and the area of the eighth invalid electrode $D_2$' increase. In this case, the area of the first touch sensing sub-region $Y_0$ of the first electrode 11 and the area of the second touch sensing sub-region $Y_0$' of the first electrode 11 reduce; the capacitance-to-ground $C_{pY}$ of the first electrode 11 reduces; the area of the third touch sensing sub-region $X_0$ of the second electrode 12, the area of the fourth touch sensing sub-region $X_0$' of the second electrode 12, the area of the fifth touch sensing sub-region $X_1$ of the second electrode 12, the area of the sixth touch sensing sub-region $X_1$' of the second electrode 12, the area of the seventh touch sensing sub-region $X_2$ of the second electrode 12, and the area of the eighth touch sensing sub-region $X_2$' of the second electrode 12 reduce; the capacitance-to-ground $C_{pX}$ of the second electrode 12 reduces; and the coupling capacitance $C_m$ between the first electrode 11 and the second electrode 12 reduces greatly. In conclusion, referring to FIGS. 7, 18, and 19, the first width $W_1$ is set to be in the range of 150 μm to 300 μm, enabling the coupling capacitance $C_m$ between the first electrode 11 and the second electrode 12, the capacitance-to-ground $C_{pY}$ of the first electrode 11 and the capacitance-to-ground $C_{pX}$ of the second electrode 12 to be each in the appropriate range, making the noise of the display panel to the touch panel relatively small, guaranteeing a relatively high sensitivity of the touch sensing signal, and improving the touch effect.

Figure 20:
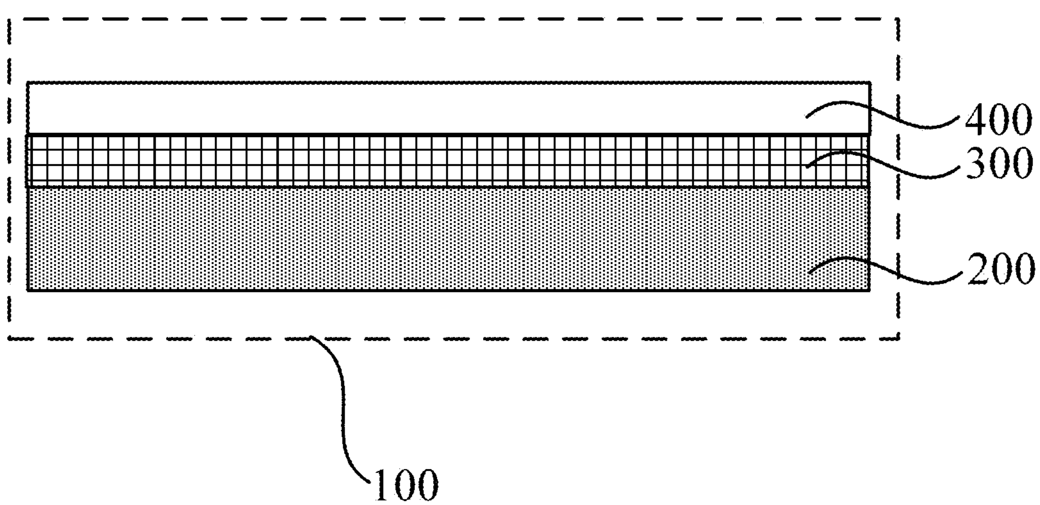
FIG. 20 is a structural view of a touch display device according to an embodiment of the present application.

In an embodiment, FIG. 20 is a structural view of a touch display device according to an embodiment of the present application. On the basis of the preceding embodiments, referring to FIG. 20, a touch display device 100 according to this embodiment of the present application includes a layered display panel 200 and the touch panel 300 described in any preceding embodiment and may further include a transparent cover plate 400 disposed on a side of the touch panel 300 facing away from the display panel 200.

What is claimed is:

1. A touch panel, comprising:

a plurality of touch electrodes disposed in a same layer comprising a touch sensing region and a capacitance adjustment region, wherein:

the capacitance adjustment region is configured to reduce at least one of capacitance-to-ground of the touch electrode or coupling capacitance between two adjacent touch electrodes, the touch sensing region is configured to transmit a touch signal, the capacitance adjustment region is provided with a floating electrode inside, the floating electrode is not connected to and is insulated with an adjacent touch electrode, the touch sensing region comprises at least two touch sensing sub-regions, the capacitance adjustment region comprises at least two capacitance adjustment sub-regions, each touch sensing sub-region of the at least two touch sensing sub-regions is correspondingly provided with at least one of the at least two capacitance adjustment sub-regions, the plurality of touch electrodes comprises a first electrode and a second electrode;

the first electrode comprises two touch sensing sub-regions, which are a first touch sensing sub-region and a second touch sensing sub-region;

the second electrode comprises at least four touch sensing sub-regions, which are a third touch sensing sub-region, a fourth touch sensing sub-region, a fifth touch sensing sub-region, and a sixth touch sensing sub-region, each of the first touch sensing sub-region, the second touch sensing sub-region, the third touch sensing sub-region, the fourth touch sensing sub-region, the fifth touch sensing sub-region, and the sixth touch sensing sub-region is correspondingly provided with one of the at least two capacitance adjustment sub-regions, each of the at least two capacitance adjustment sub-regions includes an invalid electrode, the invalid electrode is the floating electrode, and the invalid electrode is disposed in a same layer as the first electrode or the second electrode and is floated, the first touch sensing sub-region and the second touch sensing sub-region are correspondingly provided with a first invalid electrode and a second invalid electrode respectively, the third touch sensing sub-region and the fourth touch sensing sub-region are correspondingly provided with a third invalid electrode and a fourth invalid electrode respectively, the fifth touch sensing sub-region and the sixth touch sensing sub-region are correspondingly provided with a fifth invalid electrode and a sixth invalid electrode respectively, a third width of the first invalid electrode, a third width of the second invalid electrode, a third width of the third invalid electrode, a third width of the fourth invalid electrode, a third width of the fifth invalid electrode, and a third width of the sixth invalid electrode are adjusted so as to adjust areas of corresponding invalid electrodes, thereby adjusting an area of the first electrode in a corresponding region and an area of the second electrode in a corresponding region, so that the capacitance-to-ground of the first electrode or the capacitance-to-ground of the second electrode is reduced, and the coupling capacitance between the first electrode and the second electrode is reduced, and an area of each of the fifth invalid electrode and the sixth invalid electrode is larger than an area of each of the first invalid electrode, the second invalid electrode, the third invalid electrode, and the fourth invalid electrode.

2. The touch panel according to claim 1, wherein the touch sensing region is disposed around the capacitance adjustment region.

3. The touch panel according to claim 2, wherein a first length of the capacitance adjustment region is smaller than a second length of the touch sensing region, and a first width of the capacitance adjustment region is smaller than a second width of the touch sensing region, wherein the first length is a size of a long side of the capacitance adjustment region, the second length is a size of a long side of the touch sensing region, the first width is a size of a short side of the capacitance adjustment region, and the second width is a size of a short side of the touch sensing region.

4. The touch panel according to claim 3, wherein a distance between a side of the touch sensing region adjacent to a side of the capacitance adjustment region and a corresponding side of the capacitance adjustment region is greater than or equal to 50 μm, and the first width is in a range of 150 μm to 300 μm.

5. The touch panel according to claim 1, wherein a shape of the invalid electrode comprises at least one of a rectangle, a triangle, a regular hexagon, or a circle.

6. The touch panel according to claim 1, wherein the touch panel is a mutual capacitance touch panel, and the touch electrode comprises a first electrode, wherein the first electrode comprises the touch sensing region and the capacitance adjustment region.

7. The touch panel according to claim 1, wherein the touch panel is a mutual capacitance touch panel, and the touch electrode comprises a second electrode, wherein the second electrode comprises the touch sensing region and the capacitance adjustment region.

8. The touch panel according to claim 1, wherein the capacitance adjustment region is hollowed out.

9. The touch panel according to claim 1, wherein the capacitance adjustment region is filled with an insulating layer.

10. The touch panel according to claim 1, wherein the touch panel is a self-capacitance touch panel.

11. The touch panel according to claim 1, wherein a shape of the capacitance adjustment region is the same as or different from a shape of the touch electrode.

12. The touch panel according to claim 1, wherein:

the second electrode comprises a seventh touch sensing sub-region and an eighth touch sensing sub-region, each of the seventh touch sensing sub-region and the eighth touch sensing sub-region is correspondingly provided with one of the at least two capacitance adjustment sub-regions, and the seventh touch sensing sub-region and the eighth touch sensing sub-region are correspondingly provided with a seventh invalid electrode and an eighth invalid electrode respectively.

13. The touch panel according to claim 12, wherein a third width of the seventh invalid electrode and a third width of the eighth invalid electrode are adjusted so as to adjust the area of corresponding invalid electrodes, thereby adjusting the area of the first electrode in a corresponding region and the area of the second electrode in a corresponding region.

14. A touch display device, comprising: a layered display panel and the touch panel according to claim 1.

15. The touch display device according to claim 14, wherein:

the second electrode comprises a seventh touch sensing sub-region and an eighth touch sensing sub-region, each of the seventh touch sensing sub-region and the eighth touch sensing sub-region is correspondingly provided with one of the at least two capacitance adjustment sub-regions, and the seventh touch sensing sub-region and the eighth touch sensing sub-region are correspondingly provided with a seventh invalid electrode and an eighth invalid electrode respectively.

16. The touch display device according to claim 15, wherein a third width of the seventh invalid electrode and a third width of the eighth invalid electrode are adjusted so as to adjust the area of corresponding invalid electrodes, thereby adjusting the area of the first electrode in a corresponding region and the area of the second electrode in a corresponding region.

17. The touch display device according to claim 14, further comprising: a transparent cover plate, wherein the transparent cover plate is disposed on a side of the touch panel facing away from the display panel.

* * * * *